UNITED STATES PATENT OFFICE.

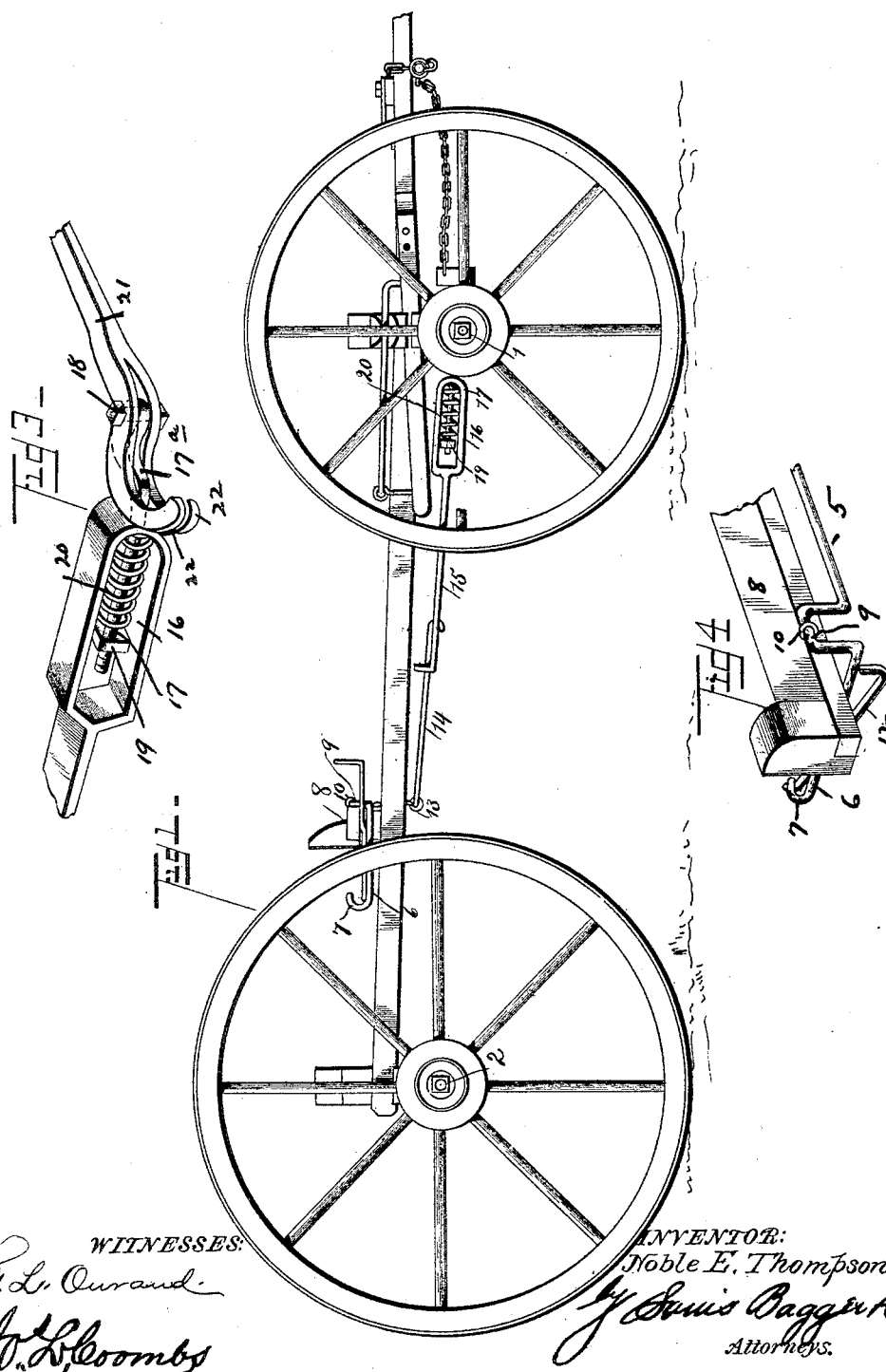

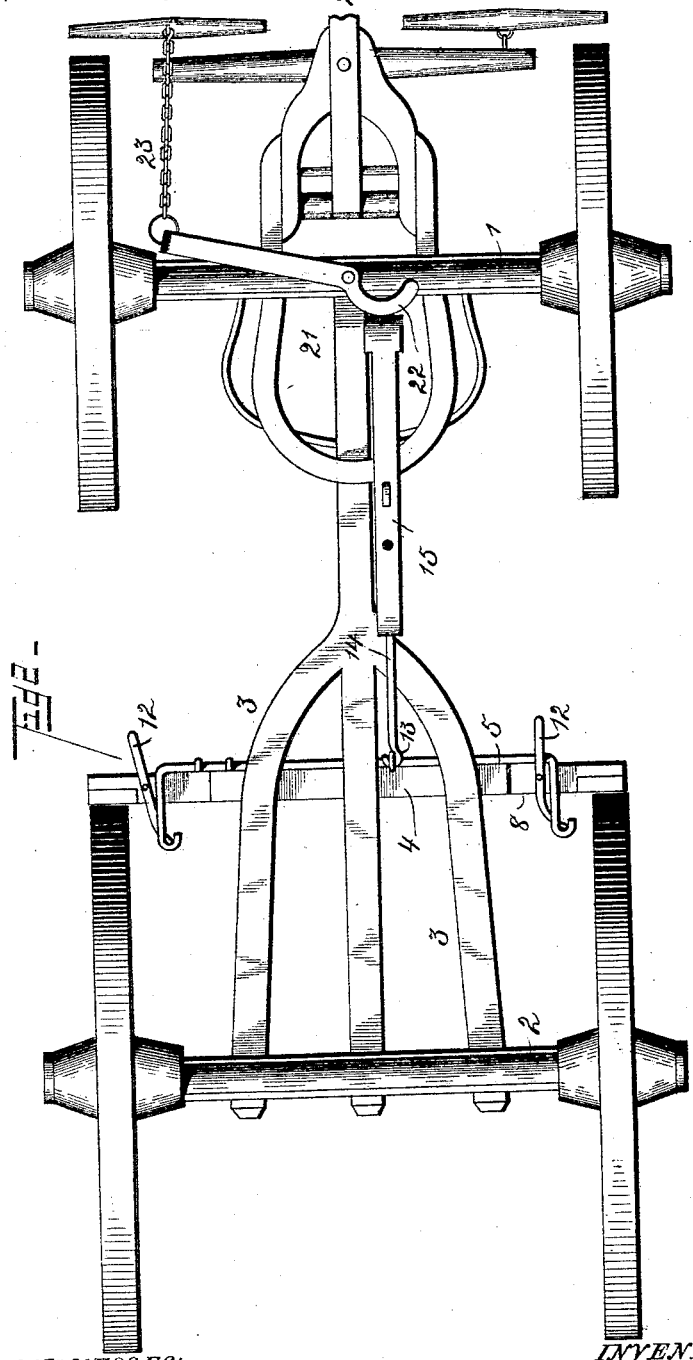

NOBLE E. THOMPSON, OF LYNCHBURG, VIRGINIA.

WAGON-BRAKE.

SPECIFICATION forming part of Letters Patent No. 454,389, dated June 16, 1891.

Application filed December 12, 1890. Serial No. 374,486. (No model.)

*To all whom it may concern:*

Be it known that I, NOBLE E. THOMPSON, a citizen of the United States, and a resident of Lynchburg, in the county of Campbell and State of Virginia, have invented certain new and useful Improvements in Wagon-Brakes; and I do hereby declare that the following is a full, clear, and exact description of the invention, which will enable others skilled in the art to which it appertains to make and use the same, reference being had to the accompanying drawings, which form a part of this specification.

My invention relates to improvements in brakes for wagons and other vehicles.

The object of the invention is to provide a simple, economical, and efficient braking mechanism for vehicles, whereby the brakes will be automatically set when going down a hill or when the tension upon the whiffletrees ceases by the draft not being brought into action.

The invention consists in the novel construction and combination of parts hereinafter fully described, and specifically pointed out in the claims.

In the accompanying drawings, Figure 1 is a side elevation of a wagon with my improvements applied thereto. Fig. 2 is a bottom plan view of the same. Figs. 3 and 4 are detail views.

In the said drawings the reference-numeral 1 designates the front and 2 the rear axles.

3 denotes the hounds, and 4 the sand-board. Pivoted to the sand-board is a rock-shaft 5, the ends of which are bent upwardly, then outwardly and downwardly, and then backwardly, forming arm 6, the ends of which are bent, forming hooks 7.

The numerals designates the brake-beam, which is connected with the bent portion 9 of the rock-bar by means of eyes or loops 10. This brake-beam is provided with the ordinary shoes or rubbers, which contact with the wheels, and at each end, on the under side, it is provided with pivoted levers 12, which can be so turned that their rear ends will engage with the hooks of arms 6. If desired to have the brakes act on the wheels when backing down steep banks or to rest the draft-animals when stopping on ascending a hill, the hook-arms 6 will prevent the brake from backing off if the levers 12 are hooked therein.

The rock-bar at its center is provided with a downwardly-depending arm 13, with which is connected the rear ends of a horizontal rod 14, which is adjustably connected with a bar 15, so that the same can be lengthened or shortened to correspond with the length of the vehicle. The front end of this bar is formed into a cage 16, having an aperture in its front, through which passes a bar 17, having its front end formed into an arm 17ᵃ, which is pivoted to the king-bolt 18 or a pin on the front axle 1. The rear end of bar 17 is screw-threaded and provided with a nut 19, and intermediate of said nut and the front of the cage is a coiled spring 20. By means of this nut the tension of the spring can be regulated. Fulcrumed to the king-bolt is a lever 21, the inner end of which is bifurcated, forming two curved arms or circle-bars 22, which embrace the curved arm 17ᵃ. The outer end of the lever 21 extends to near the end of the axle, and is provided with a chain 23, which is connected with the whiffletree 24.

The numeral 25 designates the tongue, connected with the front axle in any suitable or ordinary manner.

The operation of the device is as follows: As the draft-animals pull upon the whiffletrees the long arm of lever 21 is pulled forward by means of the chain 23, causing the circle-bars or arms 22 to force the cage 16 and the bar 15 backward. This will cause the rod 14 to be correspondingly forced backward, turning the rock-shaft 5 by means of the arm 13. This causes the brake-beam to be turned forwardly upon its pivots and the shoes or rubbers thereon to be thrown out of contact with the wheels. When, however, in going down a hill and the draft-animals pull backwardly, the tension upon the whiffletrees ceases, thus causing the bar 16 and the rod 14 to be forced forwardly, the rock-shaft 5 to be turned in the opposite direction, and the brake-shoes to be thrown into contact with the wheels. The pivoted levers 12 rest upon arms 6 of rock-shaft, the brake-shoes coming in contact with the wheels. The wheels turning forward, carry brake-beam downward, causing the pivoted levers 12 of brake-beam to bear down on long arms 6 of rock-shaft, which adds all necessary leverage to the brake. It will be noted that the brake-beam is situated above the line of the axle, the brake-shoes not extending below the beam when in contact with the wheels above the bulge of the wheels or the line of the axle. By this construction, when the vehicle is backed, the wheels reverse and carry the shoes and brake-beam upward on its hinges or eyes out of the way of friction of the wheels. The shoes do not extend below the brake-beam, thus admitting of easy operation. As soon as the draft-animals advance the brake is brought into operation, unless the draft is apparent, in which event the team pulls off the brake, as has been described.

From the above description it will be seen that the brakes automatically set themselves whenever the draft-animals cease pulling and are released when they again commence to pull.

Having thus described my invention, what I claim is—

1. The combination, with a wagon or other vehicle, of a rock-shaft pivoted to the sand-board and having a downwardly-depending arm, the brake-beam pivoted to said rock-shaft, the horizontal rod, the bar connected therewith, having its forward end formed into a cage, a screw-threaded pin passing through said cage and connected with the king-bolt, said pin being provided with a nut, a coiled spring intermediate of the nut and the front of the cage, a lever fulcrumed on the king-bolt and having curved ends bearing against the cage, and a chain connecting the long arm of said lever with the whiffletree, substantially as described.

2. The combination, with a wagon or other vehicle, of a rock-shaft pivoted to the sand-board, having a downwardly-depending arm and rearwardly-extending hooked arms, the brake-beam pivoted to said rock-shaft and provided with pivoted levers adapted to engage with said hooked arms, the horizontal rod connected with the downwardly-depending arm of the rock-shaft, the bar connected with said rod, having its forward end formed into a cage, a screw-threaded pin passing through said cage and connected with the king-bolt, said pin being provided with a nut, a coiled spring intermediate of said nut and the front of the cage, a lever fulcrumed to the king-bolt and having curved ends bearing against the cage, and a chain connecting the long arm of said lever with the whiffletree, substantially as described.

In testimony that I claim the foregoing as my own I have hereunto affixed my signature in presence of two witnesses.

NOBLE E. THOMPSON.

Witnesses:
J. C. THOMPSON,
HUGH EWING.